US012500027B2

(12) United States Patent
Mogi et al.

(10) Patent No.: US 12,500,027 B2
(45) Date of Patent: Dec. 16, 2025

(54) WOUND CORE

(71) Applicant: NIPPON STEEL CORPORATION, Tokyo (JP)

(72) Inventors: Hisashi Mogi, Tokyo (JP); Takahito Mizumura, Tokyo (JP); Teruyuki Tamaki, Tokyo (JP); Hiroshi Fujimura, Tokyo (JP); Ryu Hirayama, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 511 days.

(21) Appl. No.: 17/639,898

(22) PCT Filed: Sep. 3, 2020

(86) PCT No.: PCT/JP2020/033491
§ 371 (c)(1),
(2) Date: Mar. 2, 2022

(87) PCT Pub. No.: WO2021/045169
PCT Pub. Date: Mar. 11, 2021

(65) Prior Publication Data

US 2022/0351890 A1 Nov. 3, 2022

(30) Foreign Application Priority Data

Sep. 3, 2019 (JP) ................................ 2019-160544

(51) Int. Cl.
*H01F 27/08* (2006.01)
*H01F 3/02* (2006.01)
*H01F 27/245* (2006.01)

(52) U.S. Cl.
CPC ............ *H01F 27/085* (2013.01); *H01F 3/02* (2013.01); *H01F 27/245* (2013.01)

(58) Field of Classification Search
CPC . H01F 27/085; H01F 3/02; H01F 3/04; H01F 27/245
(Continued)

(56) References Cited

U.S. PATENT DOCUMENTS 2,892,169 A * 6/1959 Teague ................. H01F 27/245 336/212
3,223,955 A * 12/1965 Olsen ................. H01F 27/2455 336/212
(Continued)

FOREIGN PATENT DOCUMENTS

CN 104335303 A 2/2015
CN 104575972 A * 4/2015
(Continued)

*Primary Examiner* — Shawki S Ismail
(74) *Attorney, Agent, or Firm* — SOLARIS Intellectual Property Group, PLLC

(57) ABSTRACT

A wound core equipped with a laminated body including plural electrical steel sheets stacked in a ring shape in side view. The laminated body includes plural bent portions, and plural block-shaped portions at positions between adjacent bent portions. At least one block-shaped portion among the plural block-shaped portions includes a heat transmission path bordered by the electrical steel sheets at least at a portion between the stacked electrical steel sheets. The heat transmission path is included only at the at least one block-shaped portion.

11 Claims, 5 Drawing Sheets

(58) Field of Classification Search
USPC ........................................................ 336/61, 60
See application file for complete search history.

(56) References Cited

U.S. PATENT DOCUMENTS

| | | | | | |
|---|---|---|---|---|---|
| 3,309,641 | A | * | 3/1967 | Burkhardt | H01F 27/2455 336/213 |
| 3,323,955 | A | * | 6/1967 | De Nobel | H10D 10/00 438/351 |
| 3,328,737 | A | * | 6/1967 | Olsen | H01F 41/0206 29/609 |
| 3,404,360 | A | * | 10/1968 | Woodward | H01F 41/024 493/344 |
| 3,451,136 | A | * | 6/1969 | Shuttle, Jr. | G01C 15/06 33/339 |
| 3,617,965 | A | * | 11/1971 | Trench | H01F 27/22 336/212 |
| 4,621,248 | A | * | 11/1986 | Shigeta | H01F 27/25 29/605 |
| 4,646,048 | A | * | 2/1987 | Hunt | H01F 27/25 336/212 |
| 4,724,592 | A | * | 2/1988 | Hunt | H01F 27/25 29/605 |
| 2003/0112111 | A1 | | 6/2003 | Bolotinsky et al. | |
| 2011/0095642 | A1 | | 4/2011 | Enomoto et al. | |
| 2011/0234360 | A1 | | 9/2011 | Nakanoue et al. | |
| 2015/0137925 | A1 | | 5/2015 | Abe et al. | |
| 2017/0294267 | A1 | * | 10/2017 | Kodama | H01F 1/153 |
| 2019/0004843 | A1 | | 1/2019 | Durham et al. | |
| 2019/0035548 | A1 | | 1/2019 | Lubas | |
| 2019/0048434 | A1 | | 2/2019 | Mizumura et al. | |
| 2020/0126709 | A1 | | 4/2020 | Mizumura et al. | |
| 2021/0050139 | A1 | | 2/2021 | Voss et al. | |

FOREIGN PATENT DOCUMENTS

| | | | | | |
|---|---|---|---|---|---|
| EP | 3101667 | A1 | * | 12/2016 | H01F 41/024 |
| FR | 2511184 | A1 | | 2/1983 | |
| JP | S60169117 | A | * | 9/1985 | |
| JP | S64-002309 | A | | 1/1989 | |
| JP | H02-095220 | U | | 7/1990 | |
| JP | H02-95220 | U | | 7/1990 | |
| JP | H05-29157 | A | | 2/1993 | |
| JP | H08227816 | A | * | 9/1996 | |
| JP | 2011-091932 | A | | 5/2011 | |
| JP | 2017-84889 | A | | 5/2017 | |
| JP | 2018148036 | A | * | 9/2018 | H01F 3/04 |
| RU | 2237306 | C2 | | 9/2004 | |
| WO | 2010/026898 | A1 | | 3/2010 | |
| WO | WO-2015111320 | A1 | * | 7/2015 | H01F 27/2455 |
| WO | WO-2016047718 | A1 | * | 3/2016 | H01F 27/25 |
| WO | 2017/171013 | A1 | | 10/2017 | |
| WO | 2018/131613 | A1 | | 7/2018 | |
| WO | 2019/149469 | A1 | | 8/2019 | |

* cited by examiner

WOUND CORE

TECHNICAL FIELD

The present disclosure relates to a wound core.

BACKGROUND ART

A wound core is employed as a magnetic core of a transformer, a reactor, a noise filter, and the like. Hitherto in transformers, the reduction of an iron loss has become an important issue from the perspective of high efficiency, and the reduction of an iron loss is researched from various perspectives.

For example, a low noise winding transformer is disclosed in Japanese Patent Application Laid-Open (JP-A) No. 2017-84889. In this low noise winding transformer an outer periphery of a core made from steel sheets wound into a coil shape, is wound around by a circumferential direction band in the steel sheet winding direction. A stacking direction band having a vibration loss coefficient of $\eta>0.01$ is arranged at the surface side of the circumferential direction band, between the core and a winding wire wound around the core.

Moreover, for example, a wound core equipped with a wound core body of a substantially rectangular shape in side view is disclosed in JP-A No. 2018-148036. The wound core body of this wound core has a stacked structure of substantially rectangular shaped grain-oriented electrical steel sheets, having flat surface portions and corner portions alternately and contiguously in a length direction, with an angle of 90° formed between two flat surface portions adjacent at each of the corners. The grain-oriented electrical steel sheets have a substantially rectangular shape stacked structure in side view including a portion overlapping in a sheet thickness direction. In a side view of the grain-oriented electrical steel sheets, each of the corners includes two or more bent portions having a curved shape, with a total bending angle of 90° for all the bent portions present at a single corner. Moreover, in side view of the bent portion, an inside face radius of curvature r is greater than 1 mm but less than 3 mm. Furthermore, surfaces configured by a steel sheet face at the inside face and the outside face of the grain-oriented electrical steel sheets includes a 180° magnetic domain wall parallel to the length direction, a closure domain having a dimension of 150 μm or less in the length direction and a dimension of 30 μm or greater in the sheet thickness direction includes a region having a separation of from 0.5 mm to 8 mm in the length direction and present contiguously and rectilinearly in a width direction. The region where the closure domain is present occupies 25% or greater of the surface area of the steel sheet surface at the inside face or the outside face.

SUMMARY OF INVENTION

Technical Problem

Transformers and the like using wound cores are widely employed in electrical and electronic devices, however heat generated by iron loss results in a possibility of insulation paper deterioration interposed between the wound core and winding wires wound around the core. There is a possibility of the insulation paper got torn due to deterioration, and there is a possibility of insulation breakdown in a transformer in which the insulation paper has got torn. There is a need to maintain the temperature of the wound core as much as possible at a low temperature in order to prevent deterioration of the insulation paper. In order to suppress the temperature rise of the wound core in an ordinary transformer, since the wound core is housed in an oil with insulating properties (an insulating oil), the heat in the wound core is dissipated by the reservoir of this insulating oil. However, the insulating oil contributing to heat dissipation is only in contact with the wound core surface, therefore, the heat dissipation by the insulating oil occurs only at the wound core surface, so that the large amount of the heat does not dissipate insufficiently from the wound core.

An object of the present disclosure is to provide a wound core capable of maintaining a low iron loss and suppressing temperature rise.

Solution to Problem

The authors of the present disclosure have researched diligently into suppressing wound core temperature rise, and have discovered that making a large heat dissipation surface area on the wound core is important for increasing the dissipation capacity of the wound core. They have conceived the idea of heat dissipation from between stacked electrical steel sheets. However, the iron loss tends to increase when there is an excessive increase in the separation between stacked electrical steel sheets. The authors have arrived at the present disclosure on the wound cores capable of a low iron loss and of suppressing wound core temperature rise as a result of further research.

The gist of an aspect of the present disclosure based on the above discoveries is described below.

A wound core of an aspect of the present disclosure is equipped with a laminated body including plural electrical steel sheets stacked in a ring shape in side view. The laminated body includes plural bent portions, and plural block-shaped portions at positions between adjacent bent portions. One block-shaped portion among the plural block-shaped portions includes at least one heat transmission path between the stacked electrical steel sheets. The heat transmission path is included only at the at least one block-shaped portion.

Advantageous Effects of Invention

The present disclosure enables provision of a wound core capable of a low iron loss and suppressing temperature rise.

DESCRIPTION OF EMBODIMENTS

Figure 1:
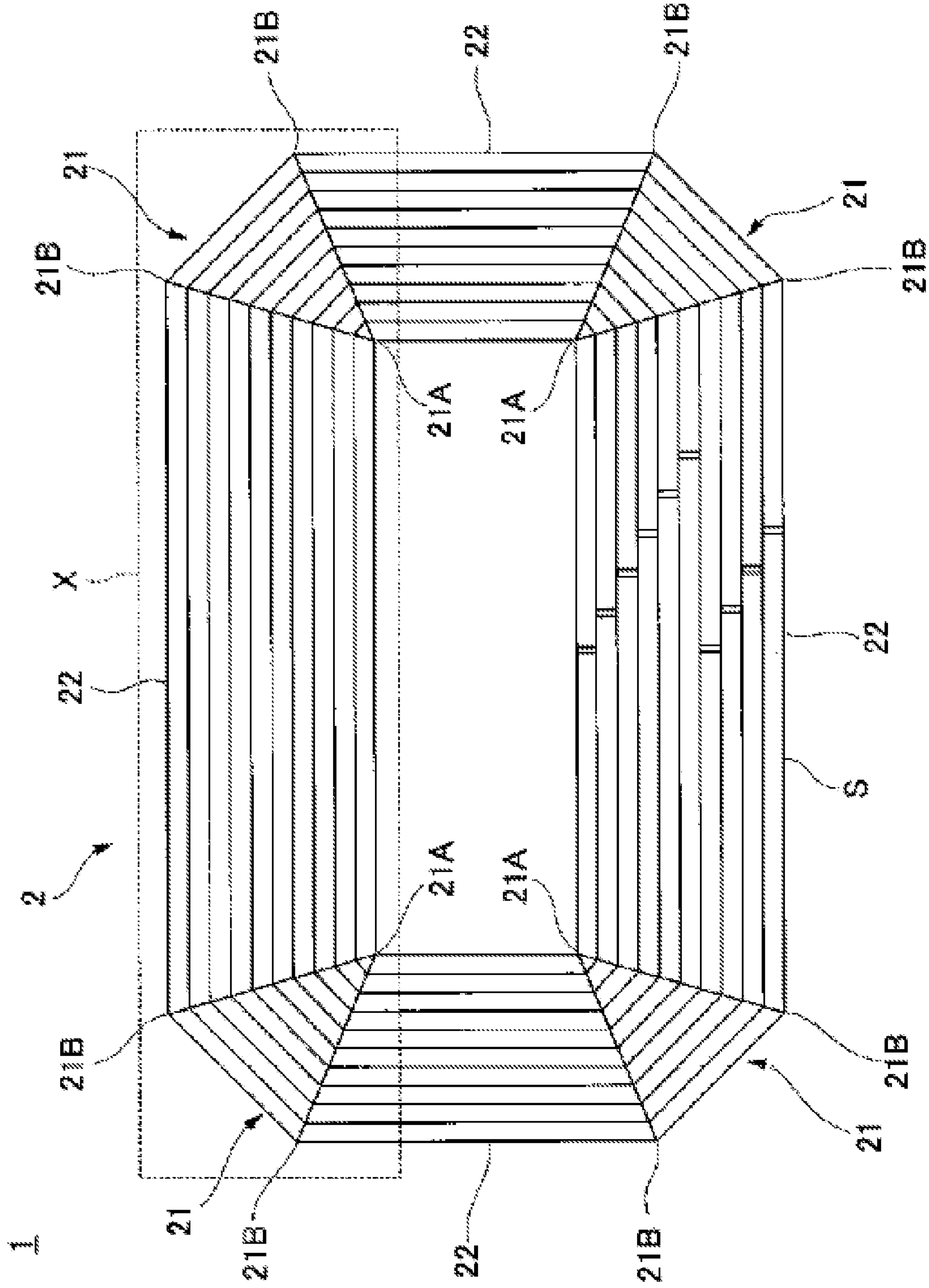
FIG. 1 is a side view illustrating an example of a wound core according to a first exemplary embodiment of the present disclosure.

Detailed description follows regarding exemplary embodiments of the present disclosure, with reference to the appended drawings. Note that configuration elements having essentially the same functional configuration are appended with the same reference numerals in the present specification and drawings, and duplicate explanation thereof will be omitted. Moreover, the proportions and dimensions of each of the configuration elements in the drawings do not represent the actual proportions and dimensions of each of the configuration elements.

First Exemplary Embodiment

Figure 2:
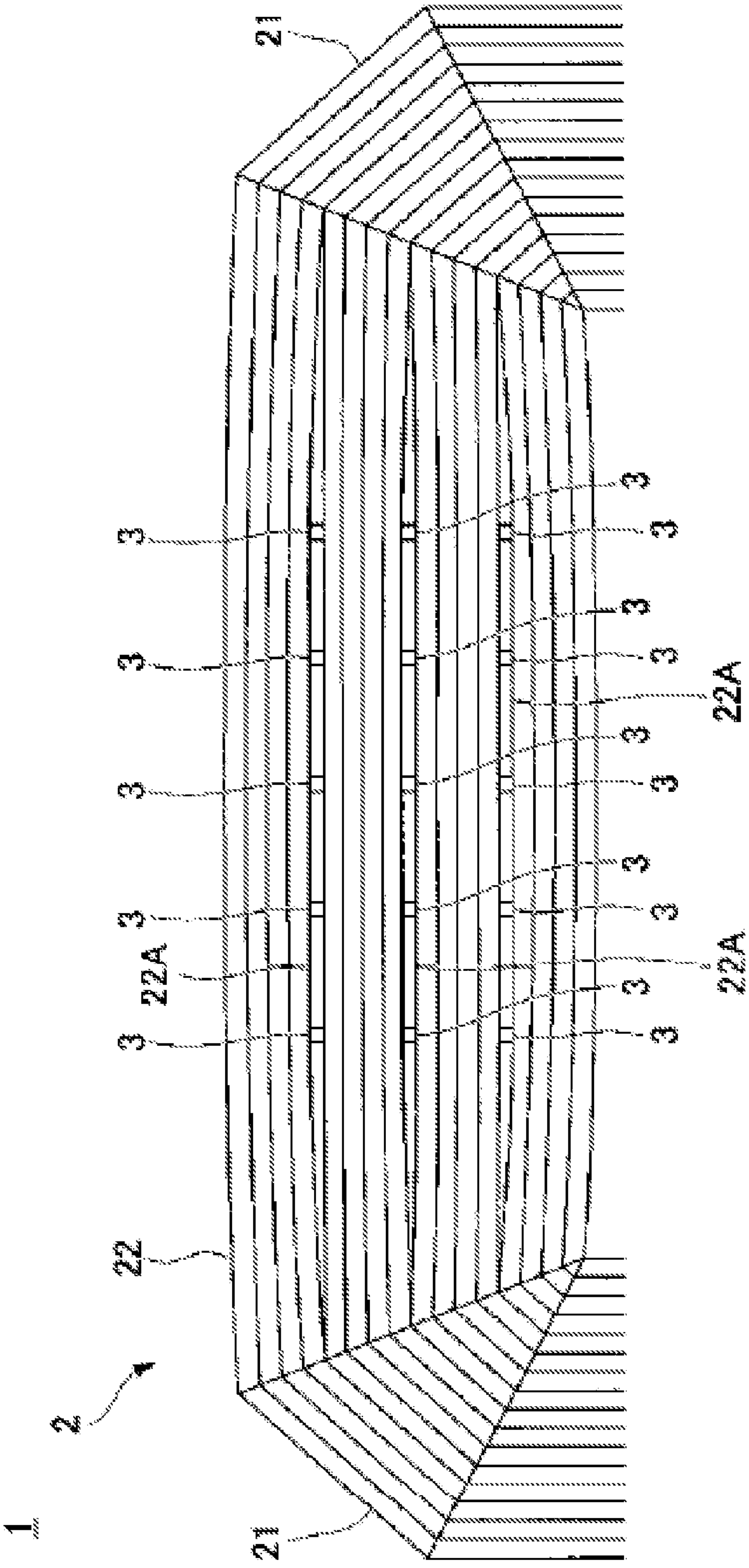
FIG. 2 is an enlarged view of a portion X in FIG. 1, and is a diagram illustrating an example of a wound core according to the first exemplary embodiment.

First, description follows regarding a wound core according to a first exemplary embodiment, with reference to FIG. 1 and FIG. 2. FIG. 1 is a side view illustrating an example of a wound core according to the present exemplary embodiment. FIG. 2 is an enlarged view of a portion X in FIG. 1, and is a diagram illustrating an example of a wound core. Note that hereinafter a situation in which electrical steel sheets S are viewed from a side face side is referred to as a side view. A direction of stacking of the electrical steel sheets S is referred to as the "stacking direction" where appropriate. Moreover, a sheet width direction of the electrical steel sheets S is referred to as the "sheet width direction" where appropriate. Furthermore, a direction of winding the electrical steel sheets S is referred to as the "winding direction" where appropriate.

A wound core 1 according to the present exemplary embodiment is, as illustrated in FIG. 1, equipped with a laminated body 2 in which plural electrical steel sheets S are stacked in a ring shape in side view (in other words when the wound core 1 is viewed from a side face). Namely, the laminated body 2 is formed by stacking plural electrical steel sheets S respectively formed in ring shapes, by stacking them in a plate thickness direction. The laminated body 2 includes plural bent portions 21, and plural block-shaped portions 22 positioned between adjacent bent portions 21. Note that reference to the side face of the wound core means a face formed by the side faces of the stacked electrical steel sheets S.

As illustrated in FIG. 1, in the laminated body 2 the electrical steel sheets S are stacked and formed into an octagonal shape in side view, and includes the plural bent portions 21 and the plural block-shaped portions 22. Specifically, the laminated body 2 is configured by folding and bending the innermost of the electrical steel sheet S in a rectangular shape so as to form four of the internal corner portions 21A. The electrical steel sheet S positioned at the outer periphery of the innermost electrical steel sheet S is then folded and bent at the internal corner portions 21A of the innermost electrical steel sheet S, with stacking continuing in this manner so as to form two external corner portions 21B. The bent portions 21 of the laminated body 2 are portions where a substantially triangular shaped region is formed by connecting straight lines from a single internal corner portion 21A to the two external corner portions 21B formed by folding and bending the electrical steel sheets S at this internal corner portion 21A. Note that the present disclosure is not limited to such a configuration. For example, for two closely adjacent internal corner portions 21A, a bent portion 21 of the laminated body 2 may be a substantially trapezoidal shaped region formed by connecting straight lines from the two internal corner portions 21A to the two external corner portions 21B. Moreover, the block-shaped portions 22 of the laminated body 2 are substantially straight line shaped portions positioned between adjacent bent portions 21. The laminated body 2 of the present exemplary embodiment accordingly includes four of the bent portions 21 and four of the block-shaped portions 22. When viewed from the side face side of the electrical steel sheet S, the laminated body 2 is configured at the outer periphery with an octagonal shape including eight of the external corner portions 21B. However, the laminated body 2 is configured at the inner periphery with a rectangular shape including four of the internal corner portions 21A.

Although, for example, either known grain-oriented electrical steel sheets or known non-oriented electrical steel sheets may be employed in the laminated body 2, grain-oriented electrical steel sheets are preferably employed. Employing grain-oriented electrical steel sheets in the laminated body 2 enables the hysteresis loss component of iron loss to be reduced, enabling the iron loss of the wound core 1 to be reduced even further.

The thickness of the electrical steel sheets S is not particularly limited and may, for example, be 0.20 mm or greater, and may be 0.40 mm or less. Using electrical steel sheets S having a small (thin) thickness means that eddy currents are not liable to occur within a sheet thickness plane of the electrical steel sheets S, enabling the eddy current loss component of iron loss to be reduced further. As a result this enables the iron loss of the wound core 1 to be reduced. The thickness of the electrical steel sheets S is preferably 0.18 mm or greater. Moreover, the thickness of the electrical steel sheets S is preferably 0.35 mm or less, and is more preferably 0.27 mm or less.

The stacked electrical steel sheets S are insulated from each other. Preferably insulation from each other is preferably performed by subjecting surfaces of the electrical steel sheets S to insulation treatment. Insulating between layers of the electrical steel sheets S means that eddy currents within the sheet thickness plane of the electrical steel sheets S are not liable to occur, enabling the eddy current loss component to be reduced. As a result this enables the iron loss of the wound core 1 to be reduced further. For example, preferably the surfaces of the electrical steel sheets S are subjected to insulation treatment using an insulating coating liquid containing colloidal silica and a phosphate.

As illustrated in FIG. 2, the laminated body 2 is equipped with spacers 3 at least at a portion between the stacked electrical steel sheets S at least one block-shaped portion 22 among the plural block-shaped portions 22. At the block-shaped portion 22 where the spacers 3 are interposed, a gap portion 22A is formed between the electrical steel sheets S where the spacers 3 are interposed.

In the laminated body 2 illustrated in FIG. 2, the spacers 3 are interposed every fixed number of stacked electrical steel sheets S, at three locations between the electrical steel sheets S on one of the block-shaped portions 22. The gap portions 22A are thereby formed between the electrical steel sheets S where the spacers 3 are interposed. In cases in which the wound core 1 is employed while immersed in insulating oil, the insulating oil is able to flow through the gap portions 22A. The gap portion 22A thereby becomes a transmission path for the heat generated in the electrical steel sheets S. The heat from the electrical steel sheets S at both sides of the gap portion 22A is transmitted to the insulating oil flowing through the gap portion 22A, dissipating the heat generated in the electrical steel sheets S. Note that the gap portion 22A is a portion where a gap has been generated by interposing the spacers 3 between the electrical steel sheets S, however the size of the gap portion 22A is taken as a region including both the gap portion and the spacers 3.

The stacking direction length of the gap portion 22A is preferably from 1 mm to 2 mm. The insulating oil flows through the gap portion 22A at a sufficient flow rate to dissipate the heat of the electrical steel sheets S as long as the stacking direction length of the gap portion 22A is at least 1 mm. This enables temperature rise in the wound core 1 to be suppressed even more. The stacking direction length of the gap portion 22A is more preferably 1.5 mm or greater. Moreover, as long as the stacking direction length of the gap portion 22A is not greater than 2 mm, an increase in magnetic flux leaking out from the electrical steel sheets S and into the gap portion 22A (leaking magnetic flux) is largely suppressed, enabling an increase in iron loss to also be suppressed. The stacking direction length of the gap portion 22A is more preferably not greater than 1.9 mm. Note that the stacking direction length of the gap portion 22A may be adjusted by changing the stacking direction length of the spacers 3. The stacking direction length of the gap portion 22A referred to here indicates a maximum length of the gap portion 22A along the electrical steel sheet S stacking direction. The stacking direction length of the heat transmission path of the gap portion 22A is the thickness of one electrical steel sheet S or greater. In other words, a gap of the thickness of one electrical steel sheet S or greater configures a heat transmission path.

Moreover, the stacking direction length of the gap portion 22A is preferably substantially constant along the sheet width direction. Note that reference here to being substantially constant includes stacking direction lengths of the gap portion 22A within ±10% of each other. The insulating oil is suppressed from lingering in the gap portion 22A due to the stacking direction length of the gap portion 22A being substantially constant. This enables the insulating oil to dissipate the heat of the electrical steel sheets S with even greater efficiency, and suppresses a temperature rise in the wound core 1 even further. In order to make the stacking direction length of the gap portion 22A substantially constant in the sheet width direction, the sheet width direction length of the spacers 3, the position of the spacers 3 at the stacking surfaces of the electrical steel sheets S, or the like may be changed. Note that the sheet width direction length of the spacers 3 is preferably the same as the sheet width direction length of the electrical steel sheets S. In other words, the spacers 3 preferably extend along the sheet width direction from one sheet width direction end of the electrical steel sheets S to the other end thereof.

Note that although providing the gap portions 22A at the at least one block-shaped portions 22 enables a temperature rise in the wound core 1 to be suppressed, the gap portions 22A are preferably provided in plural of the block-shaped portions 22. Providing the gap portions 22A in more of the block-shaped portions 22 increases the contact surface area between the electrical steel sheets S configuring the wound core 1 and the insulating oil, enabling heat from the electrical steel sheets S to be dissipated more efficiently. Furthermore, providing the gap portions 22A in plural of the block-shaped portions 22 results in a temperature rise in the wound core 1 being suppressed uniformly. Thus the gap portions 22A are preferably provided in all four of the block-shaped portions 22. Note that in cases in which the lengths of the four block-shaped portions 22 of the laminated body 2 are different from each other, providing a heat transmission path in a long block-shaped portion enables heat dissipation properties to be improved efficiently. Specifically, as illustrated in FIG. 1, the laminated body 2 of the present exemplary embodiment includes a pair of facing long block-shaped portions and a pair of facing short block-shaped portions, with spacers interposed at least at the long block-shaped portions.

The stacking factor of the electrical steel sheets S at the block-shaped portion 22 including the gap portions 22A is preferably from 86.0% up to, but not including, 91.0%. Having a stacking factor of the electrical steel sheets S at the block-shaped portion 22 including the gap portions 22A of 86.0% or greater enables a low iron loss to be maintained. The stacking factor of the electrical steel sheets S at the block-shaped portion 22 including the gap portions 22A is more preferably 89.5% or greater. Moreover, making the stacking factor of the electrical steel sheets S of the block-shaped portion 22 including the gap portions 22A less than 91.0% enables a temperature rise in the wound core 1 to be even further suppressed. Note that the stacking factor at the block-shaped portion 22 of the laminated body 2 may be computed based on JIS C 2550-5:2011. Note that JIS C 2550-5:2011 corresponds to IEC 60404-13:1995 "Magnetic materials—Part 13: Methods of measurement of density, resistivity and stacking factor of electrical steel sheet and strip".

Moreover, the gap portions 22A are preferably provided such that a distance between the inner peripheral face of the block-shaped portion 22 and a gap portion 22A, a distance between an outer peripheral face of the block-shaped portion 22 and a gap portion 22A, and a distance between adjacent of the gap portions 22A is substantially the same in the stacking direction. This results in the wound core 1 being cooled more uniformly by the insulating oil, suppressing a temperature rise in the wound core 1. In cases in which the gap portion 22A is provided in the block-shaped portion 22 interposed at a single location between the electrical steel sheets S, the gap portion 22A is preferably provided at a position such that a distance between the gap portion 22A and the inner peripheral face of the block-shaped portion 22 is substantially the same as the distance between the outer peripheral face of the block-shaped portion 22 and the gap portion 22A.

The spacers 3 are interposed between the electrical steel sheets S at the block-shaped portion 22, and form the gap portion 22A. The material employed for the spacers 3 is preferably a non-magnetic material. The spacers 3 being a non-magnetic material enables eddy currents to be prevented from being generated in the spacers 3, and as a result enables an increase in iron loss to be suppressed. The material of the spacers 3 is specifically preferably a resin, copper, brass, or the like. From amongst these the material of the spacers 3 is preferably copper. Copper is a material having a high thermal conductivity, and so employing copper for the spacers 3 enables the heat of the electrical steel sheets S to not only be dissipated by the gap portions 22A, but also to be dissipated by the spacers 3 themselves.

Moreover, the spacers 3 are preferably interposed only at the block-shaped portion 22 of the laminated body 2. In other words, the gap portions 22A are preferably provided only at the block-shaped portion 22 of the laminated body 2. This is because there is a concern regarding an increase in the iron loss due to magnetic flux leaking out from the gap portions in cases in which the gap portions are provided at the bent portion 21, being more than the increase in heat dissipation surface area. The gap portions 22A are accordingly preferably provided in the block-shaped portions 22 where a larger heat dissipation surface area can be secured that at the bent portions 21.

The size of the spacers 3 is not particularly limited as long as the gap portions 22A are able to be formed. However, as stated above, preferably the stacking direction length of the spacers 3 is from 1 mm to 2 mm in order to make the stacking direction length of the gap portions 22A from 1 mm to 2 mm. Moreover, as long as the gap portions 22A formed are capable of suppressing the temperature rise of the wound core 1, there is also no particular limitation to the number of the spacers 3 interposed at a single location between the electrical steel sheets.

Moreover, although in FIG. 2 the spacers 3 are interposed at three locations between the electrical steel sheets S in the one block-shaped portion 22, the number of locations between the electrical steel sheets S where the spacers 3 are interposed is not limited to the mode illustrated in FIG. 2, and this number may be determined according to the size of the wound core 1. However, placing the spacers 3 at from one to three locations between the electrical steel sheets S at least one block-shaped portion 22 among the plural block-shaped portions 22 enables an increase in iron loss to be suppressed more while suppressing the temperature rise of the wound core 1. Thus the spacers 3 are preferably placed at from one to three locations between the electrical steel sheets S at the at least one block-shaped portion 22 among the plural block-shaped portions 22.

Second Exemplary Embodiment

Figure 3:
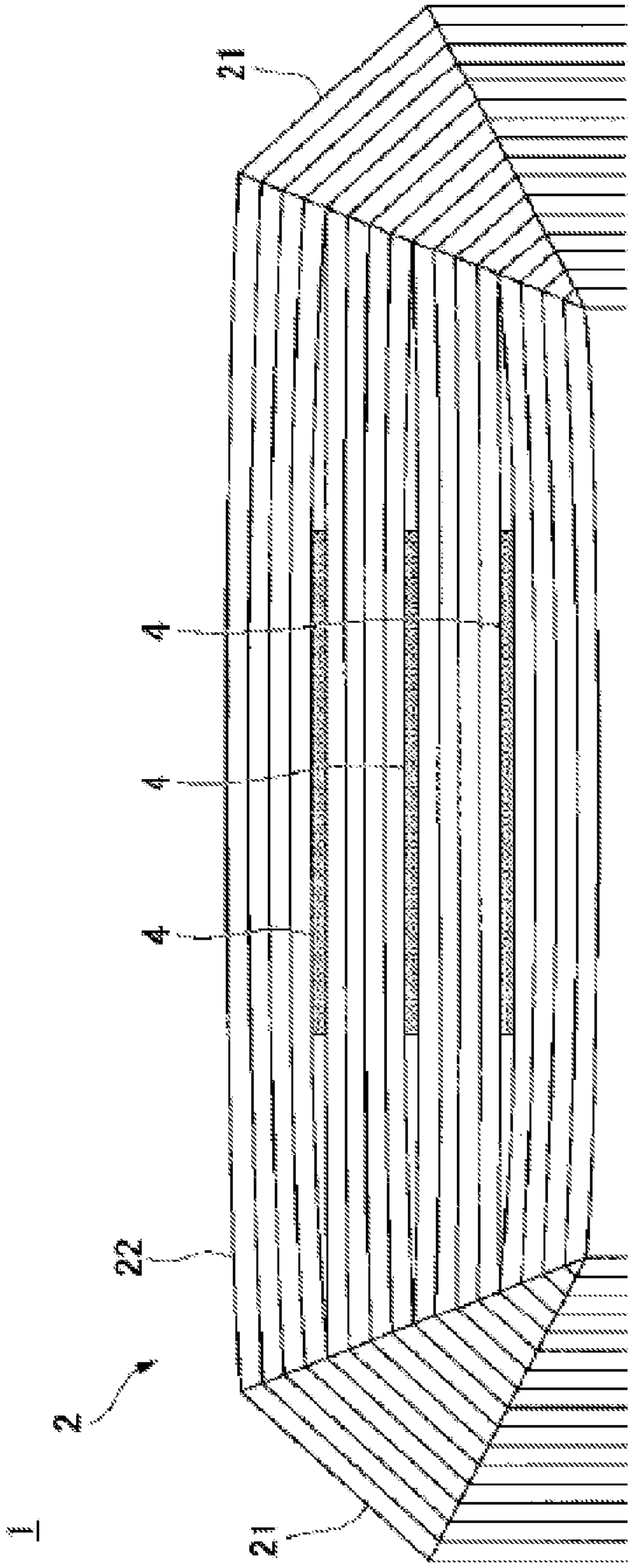
FIG. 3 is an enlarged view of a portion X in FIG. 1, and is a diagram illustrating an example of a wound core according to a second exemplary embodiment of the present disclosure.

Description continues regarding a wound core according to a second exemplary embodiment, with reference to FIG. 1 and FIG. 3. FIG. 3 is an enlarged view of a portion corresponding to portion X in FIG. 1, and is a diagram illustrating an example of a wound core according to the second exemplary embodiment of the present disclosure.

As illustrated in FIG. 1, the wound core 1 according to the present exemplary embodiment includes a laminated body 2 configured by plural electrical steel sheets S stacked in a ring shape in side view so as to include plural bent portions 21 and block-shaped portions 22 positioned between adjacent bent portions 21. As illustrated in FIG. 3, the laminated body 2 includes a heat transfer body 4 at least at a portion between the stacked electrical steel sheets S at the at least one block-shaped portion 22 among the plural block-shaped portions 22. The wound core 1 according to the present exemplary embodiment differs from the wound core 1 according to the first exemplary embodiment in the point that the heat transfer body 4 is provided at least at a portion between the stacked electrical steel sheets S at the at least one block-shaped portion 22 among the plural block-shaped portions 22. The basic configuration of the laminated body 2 according to the present exemplary embodiment is similar to that of the laminated body 2 according to the first exemplary embodiment, and so description of the laminated body 2 will be omitted. Detailed description follows regarding the heat transfer body 4.

As stated above, the heat transfer body 4 is provided at least at a portion between the stacked electrical steel sheets S at the at least one block-shaped portion 22 among the plural block-shaped portions 22. In FIG. 3, there are heat transfer bodies 4 present at three locations between the electrical steel sheets S at one of the block-shaped portions 22. Providing the heat transfer bodies 4 at least at one portion between the stacked electrical steel sheets S at the at least one block-shaped portion 22 among the plural block-shaped portions 22 means that heat generated in the electrical steel sheets S flows through the heat transfer bodies 4 and the heat is dissipated to outside of the wound core 1. The heat transfer bodies 4 accordingly act as heat transmission paths for the heat generated in the electrical steel sheets S.

The material employed for the heat transfer bodies 4 preferably has high thermal conductivity. Employing a material having high thermal conductivity as the material for the heat transfer bodies 4 enables more efficient heat dissipation of the heat generated in the electrical steel sheets S. This enables a temperature rise in the wound core 1 to be suppressed. Moreover, the material of the heat transfer bodies 4 is preferably a material that is a non-magnetic material and an insulator. Employing a material that is both a non-magnetic material and has insulating properties as the material of the heat transfer bodies 4 enables the generation of eddy currents in the heat transfer bodies 4 to be prevented. As a result this enables an increase in iron loss to be suppressed. Specifically, the material of the heat transfer bodies 4 is preferably a phenolic resin (Bakelite). A phenolic resin has high thermal conductivity and is both a non-magnetic material and an insulator. Thus a temperature rise in the wound core 1 can be suppressed by efficient heat dissipation of the heat generated in the electrical steel sheets S, enabling an increase in iron loss to be suppressed by preventing eddy currents from being generated in the heat transfer bodies 4. More precisely, the heat transfer bodies 4 are preferably configured including a paper base phenolic resin laminated sheet, a cloth base phenolic resin laminated sheet, or a glass cloth base phenolic resin laminated sheet.

Note that although the shape of the heat transfer bodies 4 is not particularly limited, preferably the heat transfer bodies 4 are shaped so as to be widely interposed between the electrical steel sheets S of the block-shaped portion 22. By interposing the heat transfer bodies 4 widely between the electrical steel sheets S of the block-shaped portion 22, the contact surface area between the electrical steel sheets S and the heat transfer bodies 4 is increased, enabling more efficient heat dissipation of the heat from the electrical steel sheets S, and enabling a temperature rise in the wound core 1 to be suppressed.

Note that although the heat transfer bodies 4 are able to suppress a temperature rise in the wound core 1 by being provided at the at least one block-shaped portion 22, the heat transfer bodies 4 are preferably provided at plural of the block-shaped portion 22. Providing the heat transfer bodies 4 at more of the block-shaped portions 22 increases the contact surface area between the insulating oil and the electrical steel sheets S configuring the wound core 1, and heat from the electrical steel sheets S flows efficiently into the insulating oil through the heat transfer bodies 4. Namely, more efficient heat dissipation of the heat from the electrical steel sheets S is enabled. Furthermore, providing the heat transfer bodies 4 at plural of the block-shaped portions 22 suppresses a temperature rise in the wound core 1 uniformly. The heat transfer bodies 4 are accordingly preferably provided to four of the block-shaped portions 22.

The stacking factor of the electrical steel sheets S at the block-shaped portion 22 including the heat transfer bodies 4 is preferably from 86.0% up to, but not including 91.0%. Having a stacking factor of the electrical steel sheets S at the block-shaped portion 22 including the heat transfer body 4 of 86.0% or greater enables a low iron loss to be maintained. The stacking factor of the electrical steel sheets S at the block-shaped portion 22 including the heat transfer bodies 4 is more preferably 89.5% or greater. Moreover, having a stacking factor of the electrical steel sheets S at the block-shaped portion 22 including the heat transfer bodies 4 of less than 91.0% enables even further suppression of a temperature rise in the wound core 1. Note that although the stacking factor may be computed based on JIS C 2550-5:2011, in the present exemplary embodiment the stacking factor is computed without considering the mass of the heat transfer bodies 4.

Moreover, the heat transfer bodies 4 are preferably provided such that there are substantially the same distances in the stacking direction for a distance between the inner peripheral face of the block-shaped portion 22 and a heat transfer body 4, a distance between the outer peripheral face of the block-shaped portion 22 and a heat transfer body 4, and a distance between adjacent of the heat transfer bodies 4. This results in the wound core 1 being more uniformly cooled by the insulating oil through the heat transfer bodies 4, suppressing a temperature rise in the wound core 1. In cases in which the heat transfer body 4 is provided at a single location between the electrical steel sheets at the block-shaped portion 22, the heat transfer body 4 is preferably provided at a position such that the distance between the inner peripheral face of the block-shaped portion 22 and the heat transfer body 4 is substantially the same as the distance between the outer peripheral face of the block-shaped portion 22 and the heat transfer body 4.

Although in FIG. 3 the heat transfer bodies 4 are interposed at three locations between the electrical steel sheets S at one of the block-shaped portions 22, the number of locations between the electrical steel sheets S where the heat transfer bodies 4 are interposed is not limited to the mode illustrated in FIG. 3, and the number may be determined according to the size of the wound core 1. However, interposing the heat transfer bodies 4 at from one to three locations between the electrical steel sheets S at the at least one block-shaped portion 22 among the plural block-shaped portions 22 enables an increase in iron loss to be further suppressed while suppressing a temperature rise in the wound core 1. The heat transfer bodies 4 are preferably interposed at from one to three locations between the electrical steel sheets S at the at least one block-shaped portion 22 among the plural block-shaped portions 22.

Modified Examples

Explanation follows regarding a number of modified examples of the exemplary embodiments of the present disclosure described above. Note that each of the modified examples described below may be applied individually to the exemplary embodiments of the present disclosure described above, or the modified examples described below may be combined and applied to the exemplary embodiments of the present disclosure described above. Moreover, each of the modified examples may be applied instead of configuration in the exemplary embodiments of the present disclosure described above, or may be applied in addition to the configuration of the exemplary embodiments of the present disclosure described above.

Moreover, although in the exemplary embodiments described above cases have been described in which the outer periphery of the laminated body has an octagonal shape, the present disclosure is not limited thereto. The outer periphery of the laminated body may be a polygonal shape, a square shape with rounded corners, an oval shape, an elliptical shape, or the like. For example, an oval shaped laminated body may be manufactured by winding an electrical steel strip. On the other hand, an octagonal shaped laminated body may be manufactured with plural electrical steel sheets folded and bent into a ring shape and stacked in the sheet thickness direction. A laminated body manufactured by stacking plural electrical steel sheets folded and bent into a ring shape by stacking in the sheet thickness direction makes a stacking factor at the bent portions liable to be smaller than in a laminated body manufactured by winding an electrical steel strip. Therefore, the stacking factor of at least one bent portion 21 among the plural bent portions 21 of the laminated body 2 may be raised. Specifically, gaps between the electrical steel sheets S in the bent portion 21 can be made smaller by compressing the bent portion 21 from both the inner peripheral side and the outer peripheral side using a compression means. This enables a higher stacking factor to be achieved at the bent portion 21, enabling a noise reduction effect to be achieved in the laminated body 2.

In the exemplary embodiments described above, cases have been described in which the inner periphery of the laminated body is a quadrangular shape, however the present disclosure is not limited thereto. The inner periphery of the laminated body may be another polygonal shape, a square shape with rounded corners, an oval shape, an elliptical shape or the like. For example, in cases in which the inner periphery of the laminated body is an octagonal shape, a portion connecting two adjacent apexes of the octagonal shape is an internal corner portion, and in cases in which the inner periphery of the laminated body is an oval shape, arc shaped portions are internal corner portions. In cases in which the inner periphery of the laminated body is a polygonal shape, a square shape with rounded corners, an oval shape, an elliptical shape or the like, the bent portions are portions at positions between one adjacent block-shaped portion and another adjacent block-shaped portion where the electrical steel sheets S are bent with respect to the extension directions of the electrical steel sheet S at the one block-shaped portion and the electrical steel sheets S at the other block-shaped portions, and stacked.

Moreover, the inner periphery of the laminated body may be shaped according to the outer periphery shape thereof. For example, in cases in which the outer periphery of the laminated body is an octagonal shape, the inner periphery may also be an octagonal shape, and in cases in which the outer periphery of the laminated body is a square shape with rounded corners, the inner periphery may also be a square shape with rounded corners.

The heat transmission paths (gap portions 22A, heat transfer bodies 4) illustrated in FIG. 2 and FIG. 3 are merely examples thereof, and obviously there is no limitation to the modes described above. For example, an indent shaped portion may be formed by subjecting a portion configuring the block-shaped portion 22 of one of the electrical steel sheets S among the superimposed electrical steel sheets S to folding and bending processing so as to form a gap portion at the inside of this indent shaped portion.

Plural exemplary embodiments according to the present disclosure have been described above. The wound core according to these exemplary embodiments is equipped with a laminated body including plural electrical steel sheets stacked in a ring shape in side view, plural bent portions, and block-shaped portions at positions between adjacent bent portions. At least one block-shaped portion among the plural block-shaped portions includes a heat transmission path bordered by the electrical steel sheets at least at a portion between the stacked electrical steel sheets. Heat generated by the electrical steel sheets when applied with an alternating magnetic field is dissipated with good efficiency by the heat transmission path, suppressing a temperature rise in the wound core. Due to the heat transmission path being provided at least at a portion between the stacked electrical steel sheets at the block-shaped portion, magnetic flux leakage from the electrical steel sheets into the heat transmission path is small, and a low iron loss is maintained.

The wound core according to the present exemplary embodiment is applicable to a transformer (not illustrated in the drawings). A transformer according to the present exemplary embodiment is equipped with the wound core 1 according to the present exemplary embodiment, a primary winding, and a secondary winding. A magnetic field is generated in the wound core 1 by an alternating current voltage being applied to the primary winding, and a voltage is induced in the secondary winding by fluctuations in the generated magnetic field. Such a wound core includes the heat transmission path at least at a portion between the stacked electrical steel sheets at the at least one block-shaped portion among the plural block-shaped portions, and so the heat generated in the wound core is dissipated through the heat transmission path. As a result a low iron loss is maintained while a temperature rise is suppressed.

Description follows regarding Test Examples of the present disclosure. The condition example of the present Test Example is an example of conditions adopted to confirm the implementability and advantageous effects of the present disclosure, and the present disclosure is not limited by this condition example. The present disclosure may adopt various conditions to achieve the object of the present disclosure without departing from the spirit of the present disclosure.

Test Example 1

A laminated body having a substantially octagonal shape including four bent portions and four block-shaped portions was manufactured by stacking grain-oriented electrical steel sheets having a thickness of 0.23 mm. A length of the laminated body in the stacking direction was 20 mm, and wound cores with the following conditions were manufactured including the numbers of gap portion listed in Table 1 for each of the four block-shaped portions. Spacers made from a phenolic resin (Bakelite) were interposed between the electrical steel sheets S at each of the four block-shaped portions of the laminated body so as to provide the gap portions. The gap portions are provided such that there were equivalent distances in the stacking direction for a distance between the inner peripheral face of the block-shaped portion and a gap portion, a distance between the outer peripheral face of the block-shaped portion and a gap portion, and a distance between adjacent of the gap portions. In a Transformer No. 2, a gap portion is provided at a position such that a distance between the inner peripheral face of the block-shaped portion and the gap portion and a distance between the outer peripheral face of the block-shaped portion and the gap portion are substantially the same distance. For the gap portions the stacking direction length was 1 mm, the sheet width direction length was 300 mm, and the winding direction length was 100 mm. Winding wires were wound around these wound cores, the wound cores installed in a tank, and the tank filled with insulating oil, so as to manufacture transformers with a capacity of 20 kVA.

Figure 4:
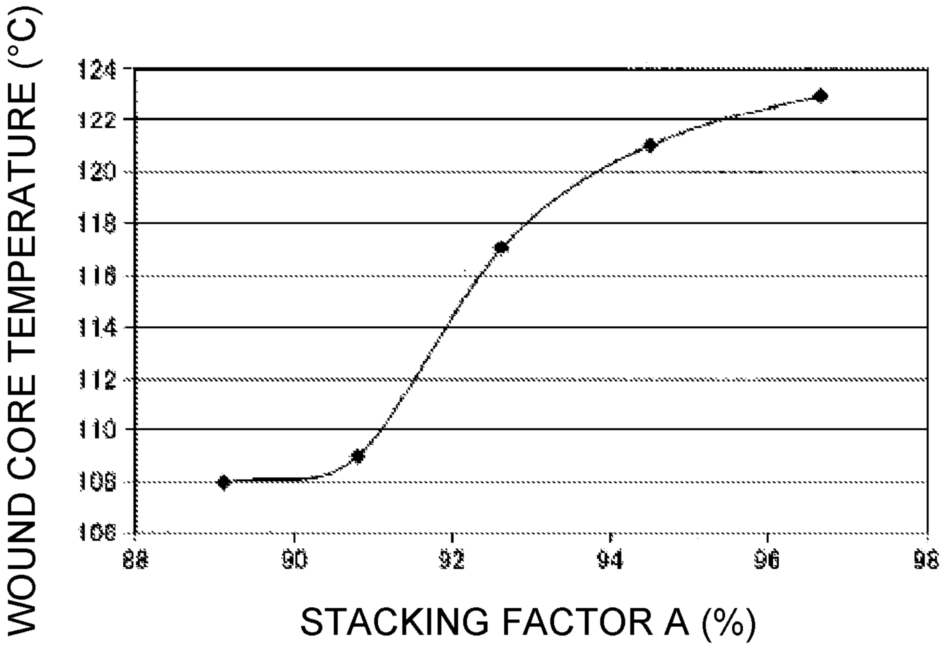
FIG. 4 is a graph illustrating a relationship between wound core temperature and a stacking factor of electrical steel sheets at block-shaped portions of a Test Example.

The stacking factor of the electrical steel sheets at the block-shaped portions was computed for the wound cores based on JIS C 2550-5:2011. Moreover, the iron loss (no-load loss) was measured for the manufactured transformers based on JEC-2200. The temperature of the wound cores was measured after operating the manufactured transformers for 12 hours. Table 1 lists the number of gap portions per single block-shaped portion, stacking factor, temperature, iron loss, and proportional iron loss increase. FIG. 4 illustrates relationships between the stacking factor of the electrical steel sheets at the block-shaped portion and the wound core temperature. Note that the stacking factor in Table 1 is an average value of the stacking factors for the electrical steel sheets at the four block-shaped portions.

The manufactured transformer was evaluated using the following criteria. An evaluation result of “A (excellent)” was given in cases in which the transformer temperature dropped relative to a baseline of the temperature of Transformer No. 1 not provided with gap portions and also a proportional iron loss increase was less than 10% relative to a baseline of the iron loss of the Transformer No. 1. An evaluation result of “B (good)” was given in cases in which the transformer temperature did not drop relative to the baseline of the temperature of Transformer No. 1 or in cases in which the proportional iron loss increase was 10% or greater relative to the baseline of the iron loss of the Transformer No. 1. Note that the evaluation result A is better than B. Note Examples in Table 1 indicate examples of implementations applying the present disclosure, and Comparative Examples indicate examples of implementations not applying the present disclosure.

TABLE 1

| Transformers | Gap Portions (Locations) | Stacking Factor (%) | Temp (° C.) | Iron Loss (W) | Proportional Iron Loss Increase (%) | Evaluation Result | Example/ Comparative Example |
|---|---|---|---|---|---|---|---|
| No. 1 | 0 | 96.7% | 123 | 69.01 | — | — | Comparative Example (Baseline Example) |
| No. 2 | 1 | 94.5% | 121 | 71.08 | 3.0 | A | Example |
| No. 3 | 2 | 92.6% | 117 | 73.15 | 6.0 | A | Example |
| No. 4 | 3 | 90.8% | 109 | 75.22 | 9.0 | A | Example |
| No. 5 | 4 | 89.1% | 108 | 77.29 | 12.0 | B | Example |

Increasing the number of gap portions provided in the block-shaped portions increased the contact surface area between the wound core and the insulating oil, and the temperature of the wound cores dropped. Moreover, as illustrated in FIG. 4, the wound core temperature dropped as the stacking factor dropped. A temperature rise was significantly suppressed in Transformer No. 4. Although the Transformer No. 5 suppressed temperature rise the proportional iron loss increase exceeded 10%.

Test Example 2

Figure 5:
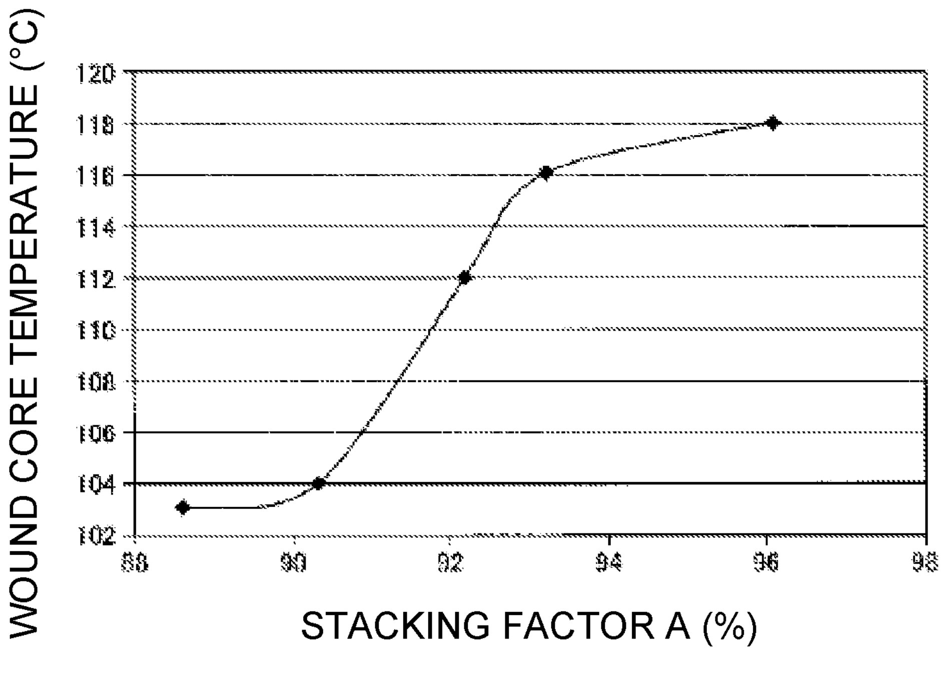
FIG. 5 is a graph illustrating a relationship between wound core temperature and a stacking factor of electrical steel sheets at block-shaped portions of a Test Example.

Wound cores were manufactured by a method similar to that of Test Example 1 by employing grain-oriented electrical steel sheets having a thickness of 0.20 mm, and transformers with a capacity of 1 kVA were manufactured using the manufactured wound cores. The length of the laminated body in the stacking direction was 20 mm, and wound cores including gap portions of the numbers listed in Table 2 at each of the four block-shaped portions were manufactured according to the following conditions. For the gap portions the stacking direction length was 1 mm, the sheet width direction length was 200 mm, and the winding direction length was 70 mm. For the manufactured transformers, the stacking factor of the electrical steel sheets at the block-shaped portions, the wound core temperature, and the iron loss (no-load loss) were measured similarly to in the Test Example 1. Table 2 lists the number of gap portions per single block-shaped portion, stacking factor, temperature, iron loss, and proportional iron loss increase. Moreover, FIG. 5 illustrates relationships between the stacking factor of the electrical steel sheets at the block-shaped portions and the wound core temperature. Note that the stacking factor in Table 2 is an average value of the stacking factors for the electrical steel sheets at the four block-shaped portions. Evaluation of the transformers was performed with similar criteria to as in the Test Example 1. Note that Examples in Table 2 indicate examples of implementations applying the present disclosure, and Comparative Examples indicate examples of implementations not applying the present disclosure.

TABLE 2

| Transformers | Gap Portions (Locations) | Stacking Factor (%) | Temp (° C.) | Iron Loss (W) | Proportional Iron Loss Increase (%) | Evaluation Result | Example/ Comparative Example |
|---|---|---|---|---|---|---|---|
| No. 1 | 0 | 96.1% | 118 | 2.09 | — | — | Comparative Example (Baseline Example) |
| No. 2 | 1 | 93.2% | 116 | 2.15 | 2.9 | A | Example |
| No. 3 | 2 | 92.2% | 112 | 2.20 | 5.3 | A | Example |
| No. 4 | 3 | 90.3% | 104 | 2.28 | 9.1 | A | Example |
| No. 5 | 4 | 88.6% | 103 | 2.36 | 12.9 | B | Example |

Increasing the number of gap portions provided in the block-shaped portions increased the contact surface area between the wound core and the insulating oil, and the wound core temperature dropped. Moreover, as illustrated in FIG. 4, the wound core temperature dropped as the stacking factor dropped. A temperature rise was significantly suppressed in Transformer No. 4. In Transformer No. 5, although a temperature rise was suppressed the proportional iron loss increase exceeded 10%.

Test Example 3

A substantially octagonal shaped laminated body including four bent portions and four block-shaped portions was manufactured by stacking grain-oriented electrical steel sheets having a thickness of 0.23 mm. A length of the laminated body in the stacking direction was 20 mm, and wound cores with the following conditions were manufactured including the numbers of heat transfer bodies listed in Table 3 for one block-shaped portion among the four block-shaped portions. Spacers made from Bakelite were interposed between electrical steel sheets at the one block-shaped portion in the laminated body so as to provide gap portions. The gap portions were provided such that there were equivalent distances in the stacking direction for a distance between the inner peripheral face of the block-shaped portion and a gap portion, a distance between the outer peripheral face of the block-shaped portion and a gap portion, and a distance between adjacent gap portions. In the Transformer No. 2 the gap portion was provided at a position such that the distance between the inner peripheral face of the block-shaped portion and the gap portion was substantially the same as the distance between the outer peripheral face of the block-shaped portion and the gap portion. For the gap portions a stacking direction length was 1 mm, a sheet width direction length was 150 mm, and a winding direction length was 100 mm. These wound cores were wound with winding wires, the wound cores installed in a tank, and the tank filled with insulating oil, so as to manufacture transformers with a capacity of 10 kVA. For the manufactured transformers the stacking factor of the electrical steel sheets at the block-shaped portion including the gap portions, the wound core temperature, and the iron loss (no-load loss) were measured with a similar method to in Test Example 1. The number of gap portions, stacking factor, temperature, iron loss, and proportional iron loss increase in the block-shaped portion including gap portions are listed in Table 3. Note that the stacking factor in Table 3 is the stacking factor for the electrical steel sheets at the block-shaped portion including gap portions. Transformer evaluation was performed with similar criteria to as in Test Example 1. Note that Examples in Table 3 indicate examples of implementations applying the present disclosure, and Comparative Examples indicate examples of implementations not applying the present disclosure.

TABLE 3

| Transformers | Gap Portions (Locations) | Stacking Factor (%) | Temp (° C.) | Iron Loss (W) | Proportional Iron Loss Increase (%) | Evaluation Result | Example/ Comparative Example |
|---|---|---|---|---|---|---|---|
| No. 1 | 0 | 96.1% | 131 | 34.51 | — | — | Comparative Example (Baseline Example) |
| No. 2 | 1 | 93.2% | 123 | 35.52 | 2.9 | A | Example |
| No. 3 | 2 | 92.2% | 119 | 36.58 | 6.0 | A | Example |
| No. 4 | 3 | 90.3% | 111 | 37.57 | 8.9 | A | Example |
| No. 5 | 4 | 88.6% | 109 | 38.65 | 12.6 | B | Example |

The present disclosure enables a low iron loss to be maintained and temperature rise to be suppressed.

Detailed explanation has been given regarding preferable exemplary embodiments and examples of the present disclosure, with reference to the appended drawings, however the present disclosure is not limited to these examples. Various modifications and improvements within a range of technological principles recited in the scope of the claims will be apparent to a person of ordinary skill in the field of technology of the present disclosure, and obviously these modifications and improvements should also be understood to belong to the technical range of the present disclosure.

Further disclosure is made of the following supplements in relation to the above exemplary embodiments.

Supplement 1

A wound core equipped with a laminated body including plural electrical steel sheets stacked in a ring shape in side view, wherein:

the laminated body includes plural bent portions, and plural block-shaped portions at positions between adjacent bent portions;

at least one block-shaped portion among the plural block-shaped portions includes a heat transmission path bordered by the electrical steel sheets at least at a portion between the stacked electrical steel sheets; and the heat transmission path is included only at the at least one block-shaped portion.

Supplement 2

The wound core of Supplement 1, wherein a stacking factor of the electrical steel sheets at the at least one block-shaped portion containing the heat transmission path is from 86.0% up to, but not including 91.0%.

Supplement 3

The wound core of Supplement 1 or Supplement 2, wherein a length of the heat transmission path in a stacking direction of the electrical steel sheets is from 1 mm to 2 mm.

Supplement 4

The wound core of any one of Supplement 1 to Supplement 3, wherein the heat transmission path is interposed at from one to three locations between the electrical steel sheets at the at least one block-shaped portion among the plural block-shaped portions.

Supplement 5

The wound core of any one of Supplement 1 to Supplement 4 further including:

a spacer at least at one portion between the stacked electrical steel sheets at the at least one block-shaped portion among the plural block-shaped portions, wherein a gap portion generated between the electrical steel sheets by the spacer is the heat transmission path.

Supplement 6

The wound core of Supplement 5, wherein the spacer is a non-magnetic material.

Supplement 7

The wound core of any one of Supplement 1 to Supplement 4, wherein the heat transmission path is formed by a heat transfer body having non-magnetic properties and insulating properties.

Supplement 8

The wound core of Supplement 7, wherein the heat transmission path is formed by a phenolic resin.

Supplement 9

The wound core of any one of Supplement 1 to Supplement 8, wherein the heat transmission path is provided to all of the block-shaped portions.

Supplement 10

The wound core of any one of Supplement 1 to Supplement 8, wherein:

the at least one block-shaped portion includes a first block-shaped portion and a second block-shaped portion longer than the first block-shaped portion; and the heat transmission path is included only at the second block-shaped portion.

Supplement 11

The wound core of any one of Supplement 1 to Supplement 10, wherein:

a shape of the laminated body in side view is an octagonal shape including four of the block-shaped portions and four of the bent portions.

Supplement 12

A wound core including:

a laminated body including plural electrical steel sheets stacked in a ring shape in side view, plural bent portions, and block-shaped portions at positions between adjacent bent portions; and at least one block-shaped portion among the plural block-shaped portions includes a heat transmission path bordered by the electrical steel sheets at least at a portion between the stacked electrical steel sheets.

Supplement 13

The wound core of Supplement 12, wherein a stacking factor of the electrical steel sheets at the block-shaped portion containing the heat transmission path is from 86.0% up to, but not including 91.0%.

Supplement 14

The wound core of Supplement 12 or Supplement 13, wherein a length of the heat transmission path in a stacking direction of the electrical steel sheets is from 1 mm to 2 mm.

Supplement 15

The wound core of any one of Supplement 12 to Supplement 14, wherein the heat transmission path is interposed at from one to three locations between the electrical steel sheets at the at least one block-shaped portion among the plural block-shaped portions.

Supplement 16

The wound core of any one of Supplement 12 to Supplement 15 further including:

a spacer at least at one portion between the stacked electrical steel sheets at the at least one block-shaped portion among the plural block-shaped portions, wherein a gap portion generated between the electrical steel sheets by the spacer is the heat transmission path.

Supplement 17

The wound core of Supplement 16, wherein the spacer is a non-magnetic material.

Supplement 18

The wound core of any one of Supplement 12 to Supplement 15, wherein the heat transmission path is formed by a heat transfer body having non-magnetic properties and insulating properties.

Supplement 19

The wound core of Supplement 18, wherein the heat transmission path is formed by a phenolic resin.

Supplement 20

The wound core of any one of Supplement 12 to Supplement 19, wherein a shape of the laminated body when viewed from the side is an octagonal shape.

Note that the entire content of the disclosure of Japanese Patent Application No. 2019-160544 filed on Sep. 3, 2019 is incorporated by reference in the present specification.

All publications, patent applications and technical standards mentioned in the present specification are incorporated by reference in the present specification to the same extent as if each individual publication, patent application, or technical standard was specifically and individually indicated to be incorporated by reference.

What is claimed is:

1. A wound core comprising a laminated body including a plurality of electrical steel sheets stacked in a ring shape in side view, wherein:

the wound core is a singular core that comprises the laminated body, the laminated body including a plurality of bent portions and a plurality of block-shaped portions at positions between adjacent bent portions;

at least one block-shaped portion among the plurality of block-shaped portions includes a heat transmission path bordered by the electrical steel sheets at least at a portion between the stacked electrical steel sheets;

the heat transmission path is not included at the bent portions and is included only at the at least one block-shaped portion; and the heat transmission path tapers before reaching a bend line formed at an intersection of a block-shaped portion and an adjacent bent portion.

2. The wound core of claim 1, wherein a stacking factor of the electrical steel sheets at the at least one block-shaped portion containing the heat transmission path is from 86.0% up to, but not including 91.0%.

3. The wound core of claim 1, wherein a length of the heat transmission path in a stacking direction of the electrical steel sheets is from 1 mm to 2 mm.

4. The wound core of claim 1, wherein the heat transmission path is interposed at from one to three locations between the electrical steel sheets at the at least one block-shaped portion among the plurality of block-shaped portions.

5. The wound core of claim 1, further comprising:

a spacer at least at one portion between the stacked electrical steel sheets at the at least one block-shaped portion among the plurality of block-shaped portions, wherein a gap portion generated between the electrical steel sheets by the spacer is the heat transmission path.

6. The wound core of claim 5, wherein the spacer is a non-magnetic material.

7. The wound core of claim 1, wherein the heat transmission path is formed by a heat transfer body having non-magnetic properties and insulating properties.

8. The wound core of claim 7, wherein the heat transmission path is formed by a phenolic resin.

9. The wound core of claim 1, wherein the heat transmission path is provided at all of the block-shaped portions.

10. The wound core of claim 1, wherein:

the at least one block-shaped portion includes a first block-shaped portion and a second block-shaped portion longer than the first block-shaped portion; and the heat transmission path is included only at the second block-shaped portion.

11. The wound core of claim 1, wherein:

a shape of the laminated body in side view is an octagonal shape including four of the block-shaped portions and four of the bent portions.

* * * * *